(12) United States Patent
Grossmann et al.

(10) Patent No.: US 7,684,890 B2
(45) Date of Patent: Mar. 23, 2010

(54) SIMULATION SYSTEM

(75) Inventors: Stefan Grossmann, Lichtenwald (DE); Eberhard Beck, Aichwald (DE)

(73) Assignee: Index-Werke GmbH & Co. KG Hahn & Tessky (DE)

( * ) Notice: Subject to any disclaimer, the term of this patent is extended or adjusted under 35 U.S.C. 154(b) by 546 days.

(21) Appl. No.: 11/518,665

(22) Filed: Sep. 11, 2006

(65) Prior Publication Data

US 2007/0061037 A1 Mar. 15, 2007

(30) Foreign Application Priority Data

Sep. 12, 2005  (DE) ........................ 10 2005 045 028

(51) Int. Cl.
*G06F 19/00* (2006.01)
(52) U.S. Cl. .................... 700/169; 700/182; 700/159
(58) Field of Classification Search ................ 700/119, 700/192, 100, 83, 182, 159, 169; 219/69.18; 715/828, 62
See application file for complete search history.

(56) References Cited

U.S. PATENT DOCUMENTS

| | | | |
|---|---|---|---|
| 6,101,425 A | 8/2000 | Govindaraj et al. | |
| 2002/0049960 A1 | 4/2002 | Monz et al. | |
| 2004/0088119 A1* | 5/2004 | Landgraf | ...................... 702/33 |
| 2006/0010006 A1* | 1/2006 | Kreidler et al. | ................. 705/1 |

FOREIGN PATENT DOCUMENTS

DE 33 18 512 12/1983

(Continued)

OTHER PUBLICATIONS

Siemens; Sinumerik 840C Softwarestand 6; 124 pages; Germany.

(Continued)

*Primary Examiner*—Kidest Bahta
(74) *Attorney, Agent, or Firm*—Reinhart Boerner Van Deuren P.C.

(57) ABSTRACT

In order to improve a simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, in such a way that it can be operated more easily, it is proposed that the simulation system comprises an operating control with a third data processing unit, which operates the action control by an operating program, and that the operating program has a program management function, which transfers at least program parts of the CNC machining program complex in a workpiece-related manner from said CNC machining program complex stored in a memory of the third data processing unit to the action control for executing said program complex.

130 Claims, 7 Drawing Sheets

FOREIGN PATENT DOCUMENTS

| DE | 197 39 559 | 3/1999 |
|---|---|---|
| DE | 101 14 811 | 10/2002 |
| DE | 103 47 169 | 5/2005 |

OTHER PUBLICATIONS

CNC-Programmiersystem; NC-Pilot; Aug. 10, 2002; 26 pages; Switzerland.

Prof. Dr.-Ing. B. Denken, Dr.-Ing. K. Tracht, Dipl.-Ing. S. Rehling: Simulationsmodul für Maschinendynamik im Rahmen eines Fertigungssimulationssystems; wt Werkstattstechnik online; 1992; 3 pages; Hannover, Germany.

English translation of German Office Action from the priority patent application proceedings (being submitted in lieu of a translation of the following foreign references cited: DE 197 39 559; DE 103 47 169; DE 33 18 512 and DE 101 14 811 and the three publications set forth above); Mar. 31, 2006; 10 pages.

Yao et al.; Web-based Virtual Machining and Measuring Cell; conference; 6 pages, pp. 673-678; The 9th International Conference on Computer Supported Cooperative Work in Design Proceedings.

Qin et al.; Development of a novel 3D simulation modelling system for distributed manufacturing; publication; 2004; 13 pages, pp. 69-81; Computers in Industry vol. 54; Elsevier.

\* cited by examiner

SIMULATION SYSTEM

CROSS-REFERENCE TO RELATED PATENT APPLICATIONS

This patent application claims the benefit of German Application No. 10 2005 045 028.8, filed Sep. 12, 2005, the teachings and disclosure of which are hereby incorporated in its entirety by reference thereto.

BACKGROUND OF THE INVENTION

The invention relates to a simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control.

Such visualization systems are known from the prior art. With these, there is only the possibility of running a simulation of program parts of the CNC machining program complex or the entire CNC machining program complex.

Even operating such a simulation system is complicated and requires detailed knowledge of the simulation system, knowledge which persons usually working on machine tools with CNC machining program complexes do not have, but have to acquire through training measures.

An object of the invention is therefore to improve a simulation system of the generic type in such a way that it is easier to operate.

SUMMARY OF THE INVENTION

This object is achieved according to the invention in the case of a simulation system of the type described at the beginning by the simulation system comprising an operating control with a third data processing unit, which operates the action control by an operating program, and by the operating program having a program management function, which transfers at least program parts of the CNC machining program complex in a workpiece-related manner from said CNC machining program complex stored in a memory of the third data processing unit to the action control for executing said program complex.

The advantage of the solution according to the invention can therefore be seen in the transfer of the program parts required for carrying out individual actions in a workpiece-related or order-related manner by the operating program with the program management function, so that the operator does not himself have to call up the program parts, compile them and transmit them to the action control, but instead this workpiece-related transfer is carried out automatically by the program management function of the operating program.

For the purposes of this patent application, machining units are to be understood as meaning units of a machine tool which are disposed on a machine bed or machine frame and are required for the machining of a workpiece, including the systems associated with these units for producing a relative movement with respect to the machine bed or machine frame.

Such machining units comprise for example

- a spindle (workpiece and/or tool spindle), a housing mounting the spindle, a spindle drive and a slide system for moving the spindle with the spindle housing and the spindle drive in relation to the machine bed or machine frame
- a tool carrier, such as for example a tool carrier head which is adjustable with respect to a housing and has one or more tool receivers with an optionally provided slide system for moving the tool carrier in relation to the machine bed or machine frame
- a workpiece support, such as for example a tailstock, with an optionally provided slide system for moving the tailstock in relation to the machine bed or machine frame.

As part of the solution according to the invention, actions of the machining units are represented by representing an outer contour of the machining unit, substantially the entire machining unit, preset by the machine model in conjunction with an outer contour of said unit preset by the machine frame, if necessary supplemented by the outer contour of further peripheral units, such as for example workpiece supplying and removing devices or workpiece detecting or measuring devices.

Furthermore, the virtual machining units and the machine frame or machine bed are represented substantially three-dimensionally, so that all the spatial collision possibilities can be sensed and detected.

In order not to have to operate the operating program according to the invention like a customary computer program, but instead to provide increased operating convenience for the operator, it is provided that a machine control panel is associated with the operating control.

Such a machine control panel allows the operator to handle the CNC machining program complex during the simulation in a manner known from machine control.

It is particularly suitable in this respect if the machine control panel allows the execution of the operating program to be controlled by means of callable functions, so that handling the operating program is also made easier by means of the program sequences of the operating program grouped together as functions.

It is particularly advantageous in this respect if the machine control panel has manual input elements, preferably function keys, with which the functions can be called, for activating individual functions of the operating program.

The manual actuation of such input elements allows the work with the operating program to be made considerably easier to the extent that no program commands have to be input via a keypad, but instead the manual actuation of the input elements is already sufficient to input the individual program commands for the individual functions of the operating program via an operating interface of the operating program.

In addition, an advantageous exemplary embodiment of a solution according to the invention provides that the machine control panel has manual input elements for influencing the CNC machining program complex.

An example of how the CNC machining program complex is influenced in such a way would be for example that of triggering a traversing movement of a selected machining unit in accordance with a manual actuation of the input elements, so that for example the machining unit changes its position.

Influencing of another kind would be movement of the machining unit in accordance with the manual actuation of the input elements, for example the turning of a turret head.

A further possibility for influencing the CNC machining program complex would be for example that of switching on a drive for a spindle or a drive for a driven tool.

In the case of all these ways of influencing the CNC machining program complex, complex processes have to be performed by the operating program. Firstly, the corresponding partial programs have to be transferred to the action control, then they have to be started and, finally, the actions of the machining units have to be monitored in accordance with the preset manual actuation of the input elements and then, in turn, the corresponding partial programs have to be stopped.

A further advantageous solution provides that the machine control panel has manual input elements for operating functions of the action control, actuation of these manual input elements leading to functions of the action control being immediately activated or stopped. An example of such functions of the action control would be direct intervention in the sequence of one or more partial programs by immediately stopping it or them or else immediately activating it or them in the action control, the action control also being influenced in this case by means of corresponding functions of the operating program which can be actuated directly when the manual input elements are actuated.

A further advantageous embodiment of a simulation system according to the invention provides that the operating control is coupled with a display area of the machine control panel and that the operating control presents on the display area information from the operating program that is intended to be indicated to an operator.

Such a display area also makes it even easier to operate the simulation system, since it provides the possibility of presenting information selected from the operating program in addition to the virtual machine tool with the virtual machining units.

The machine control panel may be associated with the visualization system according to the invention as a hardware component.

However, a particularly advantageous solution provides that the machine control panel is a virtual machine control panel represented on a visualization unit. This solution has the great advantage that the appearance, and in particular the arrangement, of the input elements of the machine control panel can be adapted by software modifications respectively to the requirements of the CNC machining program complex, or else in particular to the requirements of the operator with regard to operating convenience.

In particular, there is the possibility of forming the simulation system in such a way that the virtual machine control panel always has the appearance of the actual machine control panel provided on the machine tool.

Consequently, depending on the machine tool intended for the CNC machining program complex, the simulation system according to the invention can also be adapted with regard to the operating possibilities of the operating program and the intended functions, in particular the intended input elements, to the respective conditions of the machine tool, so that there is the possibility of always providing the operator with the same machine control panel on the simulation system that the operator also finds on the machine tool for which the CNC machining program complex is conceived or has to be conceived.

In order also to provide the possibility of manual inputs in the case of such a virtual machine control panel, it is particularly suitable if the manual input elements of the virtual machine control panel can be manually actuated by a cursor of the visualization unit.

With regard to the operating mode of the program management function, so far no further details have been provided.

An advantageous exemplary embodiment provides that the program management function of the operating program manages partial programs of the CNC machining program complex in a workpiece-related manner.

This solution has the advantage that the program management function always manages the partial programs concerning a workpiece or an order together, so that it is no longer necessary for the operator to find the individual partial programs belonging to a workpiece and respectively manage them appropriately.

It is particularly advantageous if the program management function of the operating program stores partial programs of the CNC machining program complex in a workpiece-related manner, so that the storing and subsequent finding of the partial programs is also made easier.

Furthermore, the saving of the partial programs is also made easier if the program management function of the operating program saves partial programs of the CNC machining program complex in a workpiece-related manner, that is to say in particular saves them on an external data storage device.

Furthermore, an advantageous solution provides that the program management function of the operating program transmits partial programs of the CNC machining program complex to the action control in a workpiece-related manner.

It is particularly advantageous in this respect if the program management function of the operating program distributes and activates in a workpiece-related manner partial programs of the CNC machining program complex on individual channels of the action control.

That is to say that in this case the program management function automatically detects the individual channels of the control program of the action control and then also associates the corresponding partial programs with these individual channels.

With regard to the individual further functions of the operating program, no further details have been provided in connection with the explanation so far of the individual exemplary embodiments.

As an alternative or in addition to the embodiments described so far of the simulation system according to the invention, an advantageous simulation system provides that the operating program comprises a program processing function by which the CNC machining program complex can be modified by access at least to program parts of the CNC machining program complex.

Forming a simulation system in such a way opens up possibilities previously unknown in connection with simulation systems, since the previously known simulation systems had no possibility for processing in any way the CNC machining program complex as a whole or program parts of it.

This dispenses with the need for the constant interaction between the programming console and the simulation system that is necessary according to the prior art, so that a considerable increase in the ease with which the simulation system can be operated is possible.

It is particularly advantageous if the program processing function comprises a program creation mode.

Such a program creation mode offers the advantage of creating or correcting parts of the CNC machining program complex in the programming system according to the invention directly on the latter, so that, when undesired actions are detected in the simulation, the possibility of modifying the actions or testing other alternative actions is easily provided.

Furthermore, it is advantageous if the program processing function comprises an input mode for correction values.

Such correction values may be, for example, corrections for positions of machining units or else for individual function modes of the machining units, such as for example rotational speeds.

This provides the possibility of completing the CNC machining program complex to a great extent specific to the machine tool in the course of the simulation.

The processing of the CNC machining program complex is also made even easier if the program processing function automatically takes over a program modification into the CNC machining program complex, so that the operator does not have to expressly take care of this.

Furthermore, it is advantageous if the program processing function automatically loads the partial programs that are present in the action control back into the operating control for modification.

This function has the great advantage that—unlike in the case of known simulation systems—the operator does not have to call up the individual partial programs and transfer them back to the programming console. Rather, immediately when the program processing function is called up when the respective partial program is loaded in the action control, the partial program is loaded back from the action control into the operating control for modification, and then is as needs be loaded once again into the action control.

In order with the simulation system according to the invention to allow the CNC machining program complex to be created in such a way that it is as capable as possible of running on the machine tool, it is suitably provided that the program processing function comprises an input mode for tools.

Such an input mode for tools additionally also allows the tools used to be defined and then also represented in the simulation as virtual tools.

This also considerably improves the quality of the simulation and functional assessment in the course of the simulation, since the spatial effects of the tools on the movements of the individual machining units can already be tested in the course of the simulation.

In order to allow the CNC machining program complex to be made capable to the greatest extent possible of running on the machine, it is provided in an embodiment of the simulation system according to the invention that the program processing function comprises an input mode for tool corrections, so that even the corrections required by the tools used can likewise be incorporated into the CNC machining program complex and also taken into account in the simulation.

In order with the simulation system according to the invention to allow an elimination of errors in the CNC machining program complex to be carried out more easily with regard to operating aspects, it is preferably provided that the operating program comprises an analysis function.

With such an analysis function, localizing and determining errors in the CNC machining program complex, in particular in partial programs of it, is made considerably easier, and consequently can also be carried out with more time saved.

It is preferably provided in this respect that, in an identification mode of the analysis function, an NC block currently being processed in the action control is identifiable, so that this provides the possibility that, when an error is detected in the course of the simulation, this NC block is marked, although it is currently being processed in the action control, and consequently the NC block can later be found again more easily in order to be able to check the individual sequences in detail.

A further advantageous solution provides that, in a display mode of the analysis function, the at least one program command that is active at the time can be displayed. Displaying the program command also provides the possibility of more quickly localizing the error in the program, which is for example detected in the course of the simulation, and eliminating it by suitable correction.

A further advantageous solution provides that, in a parameter display mode of the analysis function, at least one parameter of at least one of the virtual machining units can be displayed.

Such parameters of the virtual machining units are, for example, axial positions of said units, but such parameters may also be rotational speeds, for example of a workpiece spindle, or rotational speeds of driven tools or positions of turrets of the machining units.

With regard to the operating program used according to the invention, no further details have been provided in connection with the explanation so far of the individual exemplary embodiments of the simulation system according to the invention. In principle, there is the possibility as part of the solution according to the invention of writing an independent operating program which is non-specific to the machine tool and of providing this operating program with one or more of the features described above.

A particularly advantageous solution provides that the operating program corresponds to the operating program of the actual machine tool.

This solution has the great advantage that no programming effort is required to create the operating program, but instead the operating program can be taken over directly from the actual machine tool.

In addition, the use of such an operating program has the great advantage that the operator does not have to adapt in any way, since he or she is usually familiar with the operating program of the machine tool and consequently finds the same operating program with the same functions on the simulation system, so that the operator is able to work with the simulation system on the basis of his or her knowledge of the operating program of the actual machine tool without any further training, and is aware of and can apply all the ways and means of making operating easier that are provided by the operating program of the actual machine tool.

In order to be able to operate the control program in the case of such an operating program, it is necessary for communication with the control program that the operating program interacts with an adaptation program, which respectively ensures the interaction between the operating program and the control program.

No further details have been provided so far likewise with regard to the forming of the control program of the action control. An advantageous solution provides that the control program is a control program non-specific to the machine tool, so that this control program can be created in accordance with the requirements of the simulation system.

In this case, it is provided that the adaptation program adapts the operating program to the control program that is non-specific to the machine tool.

As an alternative to this, a preferred solution provides that the control program of the action control comprises the core control program of the actual machine tool for producing the control commands.

One great advantage of the solution is that it dispenses with the effort of creating the core control program as an independent program. Rather, the core control program can be taken over directly from the actual machine tool.

Such a simulation system has the advantage that there is consequently the possibility of carrying out the simulation with the same functional modes and the same functional behavior as are provided by the core control program of the actual machine tool, and consequently of carrying out the simulation of the CNC machining program complex specific to the machine tool, and consequently of creating a CNC machining program complex that is capable to the greatest extent possible of running on the actual machine tool.

It is particularly advantageous in this respect if the first data processing unit has a program environment in which the core control program of the actual machine tool works and produces control commands which correspond to control commands of the actual machine tool, so that the virtual machining units also behave in a way corresponding to a great extent to the actual machining units and, in particular, dynamic processes in the movement of the machining units in relation to one another can also be tested in the simulation.

In this case, it is suitably provided that, in particular if the operating program corresponds to the actual machine tool, the adaptation program corresponds to the communication program of the actual operating control of the machine tool, so that this adaptation program can also be taken over identically from the actual machine tool.

With regard to the data processing units, so far no further details have been provided.

In principle, it is conceivable to operate the simulation system with three data processing units that are separate from one another.

However, it is particularly advantageous if the first data processing unit and the second data processing unit work with the same processor, so that the number of processors to be used can be reduced.

It is still more advantageous if the first, second and third data processing units work with the same processor.

Furthermore, the simulation system according to the invention can be set up and used non-specific to the machine tool, that is to say that the first data processing unit and/or the second data processing unit and/or the third data processing unit are data processing units that are non-specific to the machine tool.

However, a further advantageous solution provides that the third data processing unit uses the processor associated with the operating control of the actual machine tool.

That is to say that in this case the simulation system also uses the processor of the operating control of the actual machine tool, and consequently the third data processing unit can be operated by the operating control of the actual machine tool.

The other data processing units may in this case use processors that are non-specific to the machine tool.

It is even more advantageous in the case of this solution if the second data processing unit uses the processor associated with the operating control of the actual machine tool.

A still more advantageous solution provides that the first data processing unit uses the processor associated with the operating control of the actual machine tool.

In this case, the simulation system according to the invention runs completely on the operating control of the actual machine tool, so that a simulation of the CNC machining program complex can be carried out simultaneously with the operating control of the actual machine tool.

With regard to the visualization units, so far no further details have been provided.

For example, one embodiment of the solution according to the invention provides that the visualization unit for representing the virtual machining units and the visualization unit for representing the virtual machine control panel are separate units.

This solution has the advantage that a separate visualization unit is consequently available for the virtual machine control panel, in particular to allow the individual elements of the virtual machine control panel to be represented on a suitable scale.

An alternative solution for this provides that the visualization unit for representing the virtual machining units and the visualization unit for representing the virtual machine control panel are identical. In the case of this solution, there is the possibility of providing already existing systems in particular with a single visualization unit.

It is suitably provided in this respect that the representation of the actions of the virtual machining units and the representation of the virtual machine control panel takes place at least partially superposed, the two representations suitably being displaced with respect to each other, so that the representation of the virtual machine control panel in particular does not obscure the view of the actions of the virtual machining units.

The object stated at the beginning is additionally achieved by a method for operating a simulation system for representing actions of machining units of a machine tool, in particular actions in the machining of a workpiece, in accordance with a CNC machining program complex by means of at least one first visualization unit in the form of actions of virtual machining units of a virtual machine tool, in which method an action control establishes control commands for actions of the virtual machining units by a control program processing CNC blocks of the CNC machining program complex and in which method a visualization control represents actions of the virtual machining units on the first visualization unit by a visualization program on the basis of configuration data of a stored machine model and the control commands determined by the action control, the invention providing that an operating control uses an operating program to operate the action control and the operating program uses a program management function to transfer at least program parts of the CNC machining program complex in a workpiece-related manner from said stored CNC machining program complex to the action control for executing said program complex.

The method according to the invention consequently has the same advantages as the simulation system according to the invention described above.

In addition, the method according to the invention can be developed in the same way as the simulation system described and explained in detail above.

In addition, the invention relates to a production facility for workpieces comprising at least one production area, in which at least one machine tool provided with a machine control is disposed, a production organization system with a data processing unit, which is coupled with the at least one machine control via a communication path, and with a production organization program, which provides CNC machining program complexes for the machining of workpieces of the at least one machine tool, the invention providing that at least one simulation system corresponding to the features described above is associated with the production facility and the simulation system is coupled with the production organization system via a communication path.

The advantage of the solution according to invention can be seen in that it allows the machine operator familiar with the machine tools of a production area to be additionally provided with a simulation system in which he or she can create or test CNC machining program complexes or can prepare the running-in of a CNC machining program complex on an actual machine tool, in order to keep the time period for the running-in of the CNC machining program complex on the actual machine tool as short as possible.

It is particularly advantageous in this respect if the production facility has a number of production areas, which are coupled with the production organization system, so that a complex integrated production setup can be organized with the production organization system and then the CNC machining program complexes that are used in this complex integrated setup can also be created, tested or used by the simulation system in preparation for start-up.

It is particularly advantageous if a number of simulation systems are associated with the production organization system.

Since one machine operator respectively monitors the machine tools of a production area, it is advantageous in terms of making use of the free capacities of this machine operator if the simulation system is not generally available in connection with the production facility but is associated with one production area.

It is particularly advantageous in this respect, in particular when a number of production areas are provided, if at least one of the simulation systems with the features described above is respectively associated with the number of production areas.

However, this consequently does not rule out the possibility of a number of such simulation systems even being associated with one production area.

With regard to the communication paths, so far no further details have been provided.

It is particularly advantageous if the communication path between the production organization system and the at least one machine control and the communication path between the production organization system and the respective simulation system are identically formed, so that communication of the same kind and the same quality can be achieved between the production organization system and the at least one machine control and between said production organization system and the at least one simulation system.

In order to be able to work with the simulation system as efficiently as possible in connection with the production facility according to the invention, it is provided that the production organization system provides the simulation system with CNC machining program complexes for the simulation of actions of virtual machining units on a virtual machine tool.

This provides the possibility of using the same CNC machining program complexes as are to be used in the machining of workpieces on the actual machine tools also for the simulation with the simulation system, and also of using the CNC machining program complexes that are generated and/or tested by means of the simulation system in actual machine controls of the actual machine tools by intermediary action on the part of the production organization system.

The hardware realization of such a production facility provides that the production organization system has an organization communication unit with at least one communication interface, and that the machine control is coupled with the at least one communication interface.

It is particularly advantageous in this respect if the organization communication unit has a further communication interface, with which the at least one simulation system is coupled.

A particularly advantageous solution provides that the communication interface for the at least one simulation system and the at least one communication interface for the at least one machine control are formed substantially identically.

This solution has the great advantage that the hardware configuration of the production unit can be a low-cost construction, since the same interfaces can be used both for the communication with the at least one machine control and for the communication with the at least one simulation system.

Furthermore, it is suitably provided that the organization communication unit has an organization communication program for the communication with the at least one machine control.

Furthermore, it is provided in the case of a suitable solution that the organization communication unit has an organization communication program for the communication with the at least one simulation system.

In principle, these communication programs could be differently constructed, in order to carry out an adaptation to the different functionalities.

However, in order to make the information and programs as easy to use as possible and as easy to transfer as possible, it is suitably provided that the organization communication program for the communication with the at least one machine control is substantially identical to the organization communication program for the communication with the at least one simulation system.

A communication unit with a communication program for the communication with the production organization system is preferably associated with the respective machine control.

In the same way, a communication unit with a communication program for the communication with the production organization system is also associated with the respective simulation system.

Also with regard to the communication programs, it would be conceivable to make them different on the basis of the different requirements. However, it has proven to be particularly advantageous if the communication program of the respective simulation system works with identical data formats and data specifications as the communication program associated with the respective machine control.

It has proven to be particularly advantageous in this respect if the communication program of the simulation system is substantially identical to the communication program of the respective machine control.

The solution according to the invention is particularly advantageous if CNC machining program complexes processed by the machine control can be transferred to the production organization system, since in this case there is the possibility of reusing CNC machining program complexes, as needs be corrected on the respective machine controls, it then being possible for these CNC machining program complexes to be used without any further measures and corrections.

It is further preferably provided that CNC machining program complexes simulated by the respective simulation system can be transferred to the production organization system, so that there is the possibility of using CNC machining program complexes generated on the simulation system or tested or corrected in the course of the simulation directly for an actual machine control of an actual machine tool.

The production facility according to the invention can be operated particularly easily if the production organization system manages CNC machining program complexes transferred from the respective simulation system in the same way as CNC machining program complexes transferred from the at least one machine control, so that no differentiation is required at the level of the production organization system with regard to the handling of the CNC machining program complexes, irrespective of whether they originate from machine controls or simulation systems of the production facility.

In order that the production organization system can be used optimally, it is preferably provided that the production organization system receives from the at least one machine control acknowledgements regarding the processing of the respective CNC machining program complex in said machine control. With such acknowledgements, the production organization system can optimally organize further production.

In addition, it is also likewise advantageous if the production organization system receives from the respective simulation system acknowledgements regarding the processing of the respective CNC machining program complex, so that in this way it can also already be sensed how the CNC machining program complex can be processed by the simulation system and whether for example disturbances or delays occur during this processing on account of program errors and corrections required in this connection.

In order that the acknowledgements can be processed optimally in the production organization system, it is preferably provided that the acknowledgements from the at least one machine control and the acknowledgements from the simulation system have a substantially identical structure.

In addition, it is advantageous within the production facility according to the invention if the production organization system transmits control instructions to the at least one machine control. With such control instructions it is possible for example for at least one CNC machining program complex to be transferred from the production organization system to the machine control or transferred back or for a start of the CNC machining program complex to be initiated on the machine control.

Furthermore, it is likewise advantageous in this connection if the production organization system transmits to the respective simulation system control instructions which likewise concern the transfer back and forth of CNC machining program complexes, or at least preparation for the start of simulation processes.

It is particularly advantageous in this respect if the control instructions for the at least one machine control and the control instructions for the respective simulation system have a substantially identical structure, so that the processing of the control instructions in the production organization system can also take place uniformly, irrespective of whether these control instructions are directed at a machine control or at a simulation system.

It is suitably provided in the case of the solution according to the invention that the production organization system has a data memory for the CNC machining program complexes, so that the CNC machining program complexes can be buffer-stored in the production organization system and can be transferred to the individual machine tools or simulation systems according to production planning.

In order to provide the possibility of detecting in the individual CNC machining program complexes the extent to which they have only been generated, have been tested or have already been tested in an ongoing production process and as needs be corrected, it is preferably provided that the CNC machining program complexes are identifiable by a property field as untested or simulation-tested for the production organization program, so that the production facility has the possibility of identifying the non-tested CNC machining program complexes and assigning them to a simulation system at a given point in time for testing.

In the same way, the production organization program is capable of identifying a simulation-tested CNC machining program complex and then, for running in on an actual machine tool, assigning it to the actual machine control of this machine tool.

It is also particularly suitable if the CNC machining program complexes are identifiable by the property field as production-tested for the production organization program, so that the production organization program is capable of assigning these programs to a machine control for machining to be started immediately.

Furthermore, an advantageous exemplary embodiment of a production facility according to the invention provides that the production organization system manages the CNC machining program complexes in a workpiece-related manner and consequently also transfers them in a workpiece-related manner, whereby the entire handling of the CNC machining program complexes can take place more easily.

Further features and advantages of the solution according to the invention are also the subject of the description which follows and the graphic representation of several exemplary embodiments.

DETAILED DESCRIPTION OF THE INVENTION

Figure 1:
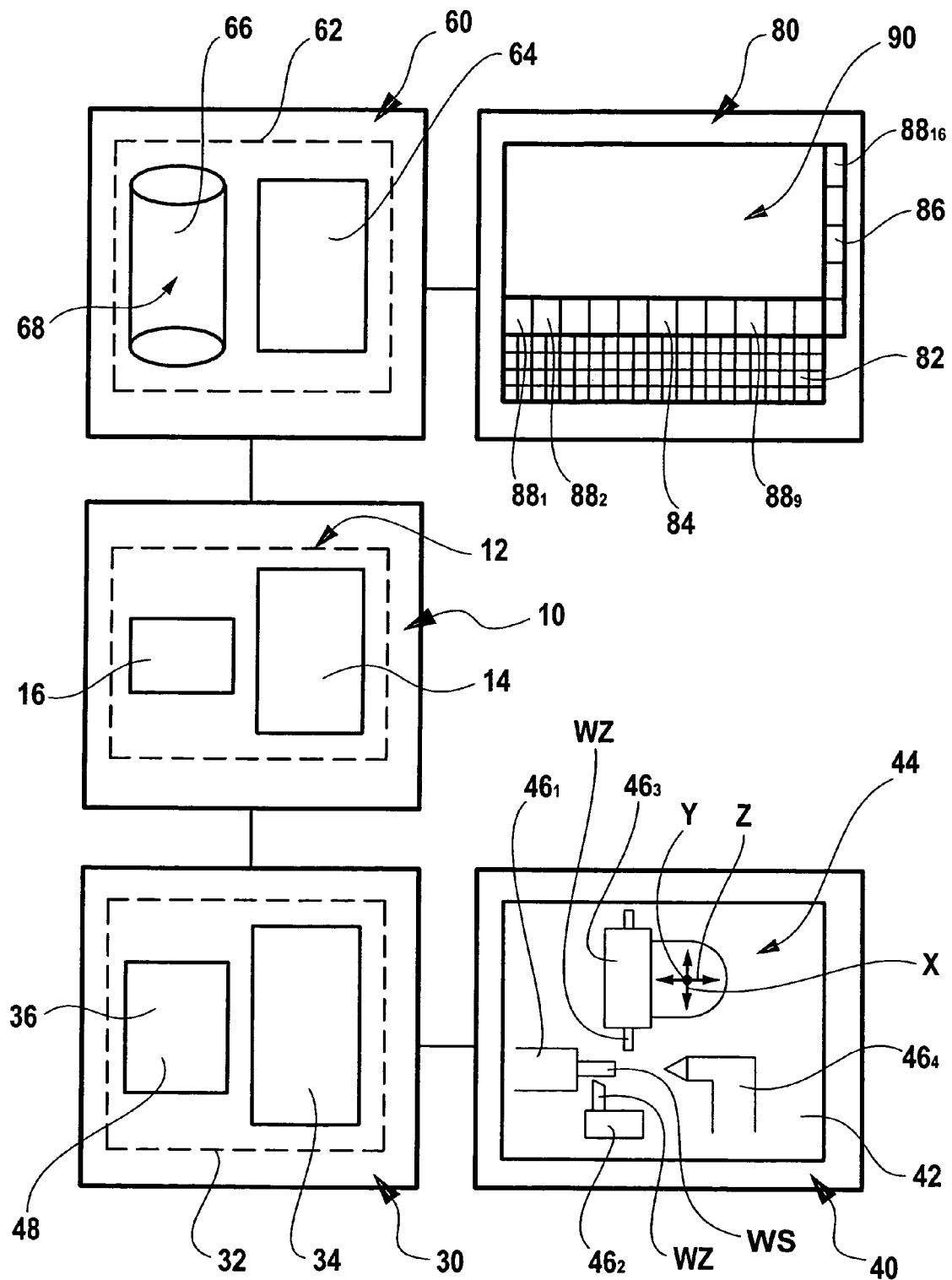
FIG. 1 shows a schematic representation of an equipment configuration of a first exemplary embodiment of a simulation system according to the invention.

A first exemplary embodiment of a simulation system according to the invention, represented in FIG. 1, comprises, as represented in FIG. 1, an action control, designated as a whole by 10, with a first data processing unit 12, which has for example a processor 14 and a memory 16, the memory 16 being formed as a memory with rapid access, that is to say for example a random access memory.

Running on the data processing unit 12 is a control program 18, which is capable of processing CNC blocks from one or more partial programs 20, for example from the partial programs $20_1$ to $20_4$, the partial programs $20_1$ to $20_4$ being associated with individual channels $22_1$ to $22_4$ of the control program 18 and allowing parallel processing of the individual programs $20_1$ to $20_4$, which either takes place independently of each other or can be synchronized by synchronizing commands.

In each of the channels $22_1$ to $22_4$, control commands $24_1$ to $24_4$ are established, serving for instigating and possibly controlling actions of machining units. For example, a channel is respectively associated with a functional mode of a machining unit, for example a movement axis of the machining unit or a rotational position of a workpiece spindle.

Since the simulation system according to the invention does not work with an actual machine tool and consequently does not work with actual machining units, a visualization control designated as a whole by 30 is provided, having a second data processing unit 32, which likewise comprises for example a processor 34, which is capable on the basis of a machine model 48 stored by configuration data in a memory 36 of activating a first visualization unit 40 in such a way that it shows on a screen 42 a virtual machine tool 44, which comprises virtual machining units $46_1$ to $46_4$.

For example, the virtual machining unit $46_1$ is a workpiece spindle, in which a workpiece WS can be received.

For example, the machining units $46_2$ and $46_3$ are respectively independently movable tool carriers with a multiplicity of virtual tools WZ, which can be brought into a working position by movements of the tool carriers along movement axes X, Y, Z provided for them.

Finally, a further machining unit $46_4$ may be a tailstock.

However, instead of the tailstock, it is also conceivable to provide as the machining unit $46_4$ a counter spindle with respect to the workpiece spindle $46_1$.

For example, the control program 18 is in this case configured with the channels $22_1$ to $24_4$ in such a way that each of the channels $22_1$ to $22_4$ processes the partial program $20_1$ to $20_4$ associated with it, the control commands $24_1$ to $24_4$ that are thereby generated respectively being intended for controlling one of the machining units $46_1$ to $46_4$.

Figure 2:
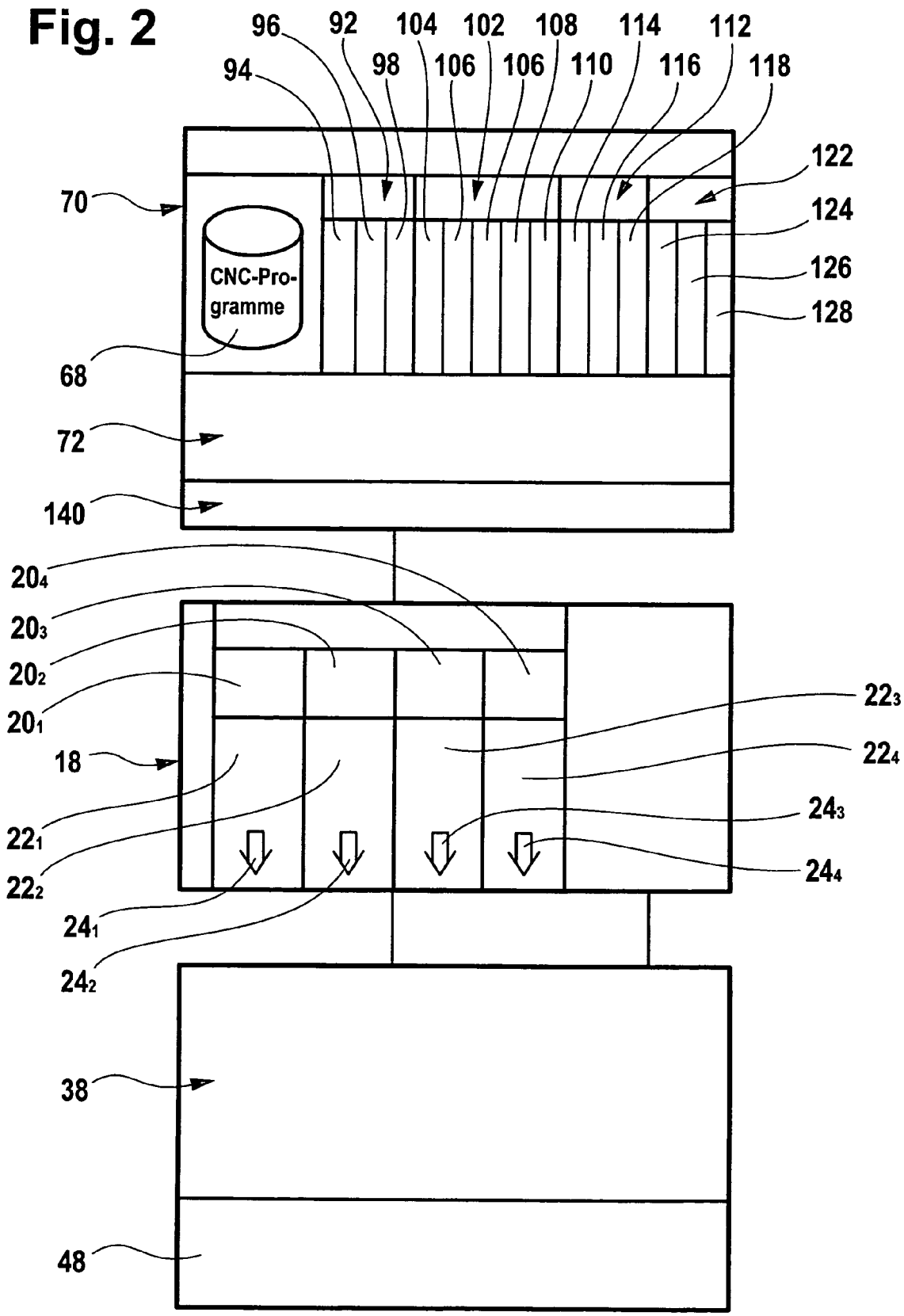
FIG. 2 shows a schematic representation of a program configuration of the first exemplary embodiment of the simulation system according to the invention.

With a visualization program 38 represented in FIG. 2, the visualization control 30 then generates on the basis of the machine model 48 stored in the form of configuration data in the memory 36 the virtual machining units $46_1$ to $46_4$ as such on the screen 42 together with the actions preset by the control commands $24_1$ to $24_4$, for example in the form of relative movements of the machining units $46_1$ to $46_4$ or individual movements of the machining units $46_1$ to $46_4$, which may comprise for example rotary drive of the workpiece WS in the workpiece spindle $46_1$ or driving one of the tools WZ or moving a turret head of the machining unit $46_3$.

As represented in FIG. 1, the action control 10 can be controlled by an operating control 60, which has a third data processing unit 62, which for its part comprises for example a processor 64 and a memory 66 for one or more CNC machining program complexes 68. Therefore, the entire CNC machining program complex 68 intended for the simulation is stored in the memory 66.

On the third data processing unit 62 there runs an operating program, which is designated as a whole by 70 and schematically represented in FIG. 2, and which has an operating interface 72, which interacts with a machine control panel, which is designated as a whole by 80 and comprises for example a customary keypad 82 and rows 84 and 86 of function keys $88_1$ to $88_{16}$.

Both by means of the keypad 82 and by means of the function keys 88, there is the possibility of calling up and/or activating individual functional sequences or modes of the operating program 70 via the operating interface 72.

Furthermore, a display area 90, which permits the display of information determined by the operating program 70, is also preferably associated with the machine control panel 80.

The display area 90 can in this case preferably be activated from the operating interface 72.

The operating program 70 comprises, for example, a program management function, which is designated as a whole by 92 in FIG. 2 and is capable of managing the CNC machining program complex 68 stored in the memory 66 in a workpiece-related manner, that is to say that the program management function 92 manages the individual partial programs 20 of the CNC machining program complex 68 in such a way that the partial programs 20 belonging to a workpiece WS are processed in accordance with their functional association.

For example, a transfer mode 94 of the program management function 92 provides that the partial programs 20 belonging to the same workpiece are transferred from the operating control 60 to the action control 10 in a functional interrelationship for the simulation of the machining of this workpiece WS and are thereby transferred in a workpiece-related manner to the control program 18, that is to say for example are associated with the individual channels 22 of the control program 18 in a functionally correct manner and are correspondingly activated.

In the same way, the transfer function 94 is also capable, for example after completion of the simulation of a machining operation, of transferring the partial programs 20 that are associated with the individual workpiece WS back once again from the action control 10 to the operating control 60 and storing them in the memory 66 in relationship with the respective workpiece WS.

The program management function 92 additionally comprises for example a saving mode 96, which for example is capable of instigating external saving of the workpiece-related partial programs.

A further mode of the program management function 92 is for example a start/stop mode 98, in which the program management function 92 of the operating program 70 intervenes directly in the action control 10, in order to start or stop the individual partial programs 20 for processing on the basis of a predefined key.

The start/stop mode 98 may, however, also be used directly for starting and stopping individual partial programs 20 for processing, independently of the predefined key, for example on the basis of the actuation of one of the function keys 88 of the machine control panel 80. For example, the function key $88_1$ may be used for the purpose of starting a selected partial program and the function key $88_2$ may be used for the purpose of stopping a selected partial program.

In addition, the operating program 70 also comprises for example a program processing function 102, with which various interventions in the CNC machining program complex 68 are possible.

For example, a program creation mode 104 provides that creation of a program is possible by means of the machine control panel 80, for example the keypad 82, by input of CNC blocks or a program correction is possible by insertion or deletion of CNC blocks.

Furthermore, the program processing function 102 also comprises for example an input mode 106 for the input of correction values, for example for operating parameters or positions of the machining units 46.

A further mode of the program processing function 102 is for example an input mode 108 for tools, which allows tools WZ to be associated with the individual machining units 46, tool parameters for these tools WZ also being transferred to the CNC machining program complex 68 at the same time as the association is established.

Finally, an input mode 110 provides the possibility of inputting correction values for selected tools WZ.

The program processing function 102 provides the possibility of creating the CNC machining program complex in connection with the simulation in such a way that it is as capable as possible of running on the machine tool, so that the CNC machining program complex can be taken over directly on the machine tool for machining.

In addition, an advantageous embodiment of the operating program 70 according to the invention also comprises an analysis function 112, which serves the purpose of detecting errors in the CNC machining program complex.

The analysis function 112 creates many possible ways and means of making it easier for program errors to be found, in particular in the course of the simulation.

The analysis function 112 preferably comprises an identification mode 114 for a currently processed NC block, with which this NC block that is currently being processed by the action control in one of the channels 22 can be marked, to allow it to be identified later.

Furthermore, the analysis function 112 preferably comprises a display mode 116, by which it is capable of displaying the at least one program command that is active at the time. That is to say that in this case the analysis function 112 is capable of establishing which program command of one of the partial programs 20 is active in the action control 10 and leads to action of one of the machining units 46.

Finally, a position display mode 118 of the analysis function 112 is provided, allowing an axial position of at least one of the machining units 46 to be displayed, that is to say the position in which this at least one of the virtual machining units 46 is located in relation to the other virtual machining units.

The operating program 70 according to the invention then provides many possible ways and means of conveniently operating the simulation system according to the invention.

The advantage of the operating program 70 according to the invention is to be seen in first instance in that, on account of the program management function 92 working in a workpiece-related manner, it does not manage individual partial programs, that is to say does not store, transfer or save individual partial programs, but instead always manages all the partial programs belonging to a workpiece WS, in particular with tool data, zero offsets and other parameters relevant for the production of a workpiece WS, so that, by contrast with the previously known simulation systems, the partial programs do not have to be individually transferred, loaded and managed by the operator.

Particularly advantageous in this respect is the workpiece-related transfer of the partial programs to the action control 10 and also the workpiece-related loading of the partial programs in the action control 10, in particular the automatic distribution and association of the partial programs with respect to the individual channels 22 of the control program 18 in the transfer mode 94.

Finally, the start/stop mode 98 that can be activated by manual actuation of one of the function keys 88 also creates the possibility of starting or stopping the partial programs for processing on the basis of a predefined key or else selecting and activating partial programs 20 by manual actuation of one of the function keys 88.

A further advantage over known simulation systems is that the simulation system according to the invention with the program processing function 102 in the program creation mode 104 allows the creation of elements of partial programs or of entire partial programs.

In this program creation mode 104, there is also the possibility of providing programming support by parameterizing masks and predefined subprogram calls.

In addition, the input mode 106 for correction values also creates the possibility of inputting and correcting for example parameters of the virtual machining units 46.

Finally, there is also the possibility in the course of the simulation of presetting tools WZ which are to be used later on the machine and the geometry of which is to be taken into account right away in the simulation via the input mode 108 for the tools WZ, so that the partial programs can later be used on the actual machine tool without any modification, or conversely partial programs can be taken over from the machine tool directly into the simulation system for the simulation and checking and/or correction.

Finally, the input mode 110 for tool corrections creates the additional possibility of also correcting tool dimensions already in the simulation system and consequently of directly generating partial programs that are capable of later running on the machine tool and are already in the simulation system, or else conversely of taking over to the simulation system partial programs that are running in the machine tool and checking and as needs be modifying them in this system.

Finally, the analysis function 112 also creates the possibility not only of simulating the CNC machining program complex 68 in the simulation system, but also in the event of errors occurring of analyzing them with the greatest possible support for the operator.

Such an analysis of errors is made easier by the identification mode 114 providing the possibility in the visual analysis of the simulation of the machining of the workpiece WS of allowing the currently processed NC block to be identified later in the event of an error being detected by providing it with an identification or marking, and consequently of allowing the error to be found very quickly in the respective partial program.

Furthermore, there is the possibility with the display mode 116 of the analysis function 112 also of displaying in the display area 90 the at least one program command that is active at the time or a number of program commands that are active at the time simultaneously with the processing of the said command or commands, so that the user of the simulation device is able to identify which program commands may possibly be erroneous.

Finally, an error display is made even easier by the parameter display mode 118, which indicates the at least one current axial position of at least one of the virtual machining units 46, and consequently makes error analysis or error searching easier.

A further possible parameter which can be displayed by the parameter display mode 118 would also be a rotational speed of a virtual workpiece spindle.

Apart from the functions so far that are directly associated with the virtual machining of a workpiece, there is however also the possibility of providing further functions in the operating program 70, for example special functions 122, which can for example be activated via the machine control panel 80 by actuating one of the function keys 88, and may be helpful both in the machining of an actual workpiece and in the analysis of the simulation.

Such a special function 122 may comprise, for example, a traveling mode 124, in which the virtual machining units 46 can be made to traverse along their movement axes by actuating input keys 88.

Another possibility is to provide a traversing mode or else a starting mode 126, which allows the virtual machine tool 44 to be emptied, that is to say the workpiece WS to be removed, or the empty virtual machine tool 44 to be started up with a workpiece WS, that is to say to begin or continue a virtual machining operation.

Finally, there is also the possibility of providing for example a change-over mode 128, which provides a change-over of tools.

The solution according to the invention consequently allows such a special function 122 not only to be simulated, but also to be programmed in connection with the simulation and to be investigated for possible errors in connection with the simulation.

The operating program according to the invention is user-friendly to a particularly high degree in particular if it corresponds to the operating program of the actual machine tool on which the CNC machining program complex 68 is to be used. In this case, there is no conversion problem for the user or the operator of the simulation system, since the operating program 70 of the simulation system has exactly the same functions as the operating program of its actual machine tool.

A further considerable advantage is that the operating program 70 does not have to be generated specifically for the simulation system according to the invention, but that the operating program of the actual machine tool can be taken over directly.

One particular advantage with regard to user friendliness is also obtained if the machine control panel 80 of the simulation system according to the invention corresponds substantially to the machine control panel 80 of the actual machine tool.

In particular, it is advantageous in this respect if the function keys 88 of the machine control panel 80 are associated with the same functions of the operating program 70.

In this case, the local association of the individual functions of the operating program 70 with the individual function keys 88 does not necessarily have to correspond to the association of the actual machine tool. However, user friendliness is made even easier by the association of the functions of the operating program 70 with the individual function keys 88 being substantially identical to that of the actual machine tool.

In the same way, it is also advantageously provided that the display area 90 displays the information that is displayed by the operating program 70 via the operating interface 72 in substantially the same way as the display area 90 of the machine control panel 80 of the actual machine tool.

In the case of the first exemplary embodiment of the simulation system according to the invention, represented in FIGS. 1 and 2, it is provided for example that the control program 18 is an independent program, for example a replicated CNC control program, which is non-specific to the machine tool.

In this case, an adaptation program 140 which ensures the communication between the operating program 70 and the control program 18, representing a CNC replication, must be associated with the operating program 70.

Figure 3:
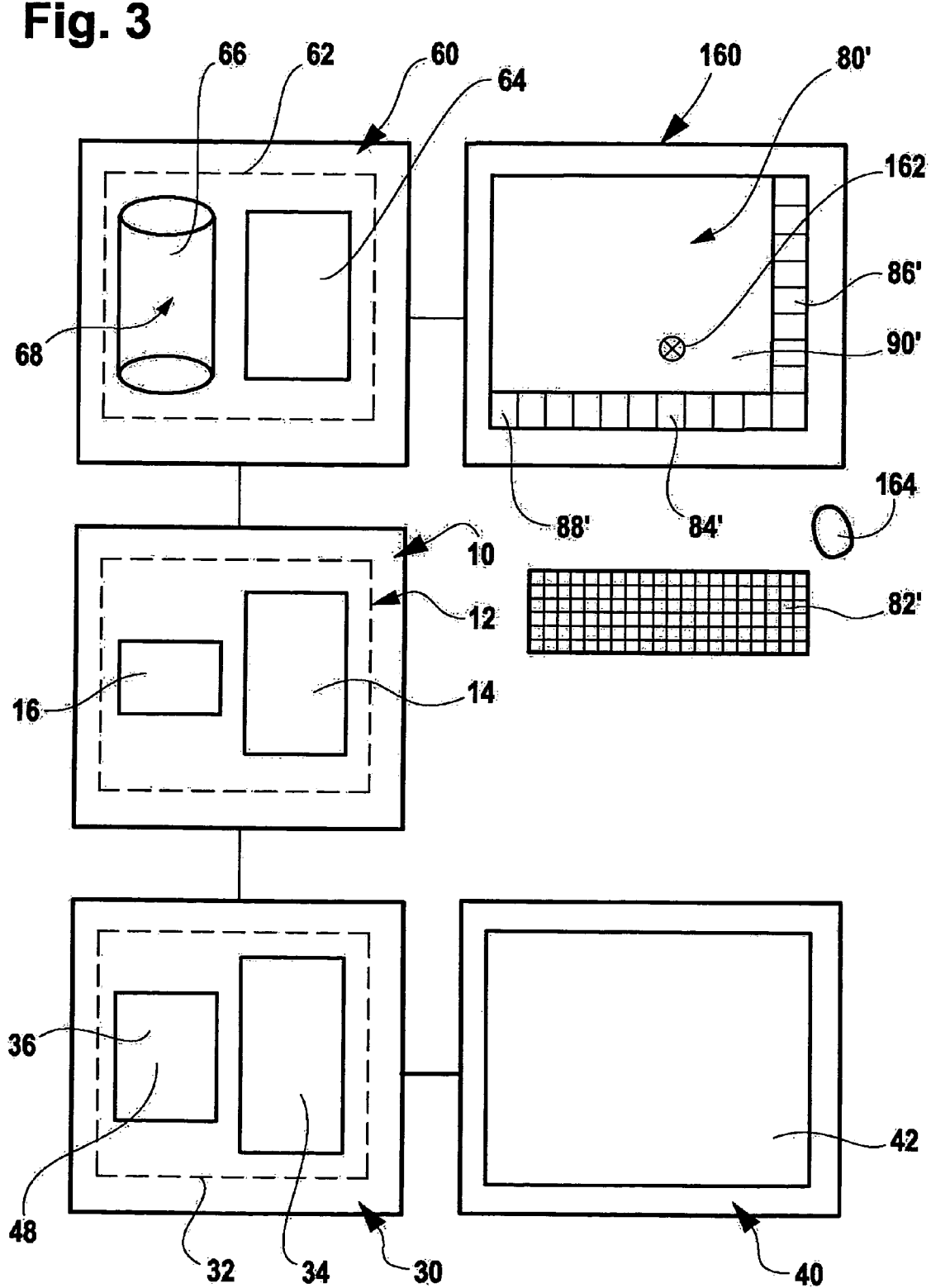
FIG. 3 shows a schematic representation of the equipment configuration corresponding to FIG. 1 in the case of a second exemplary embodiment of a simulation system according to the invention.
Figure 4:
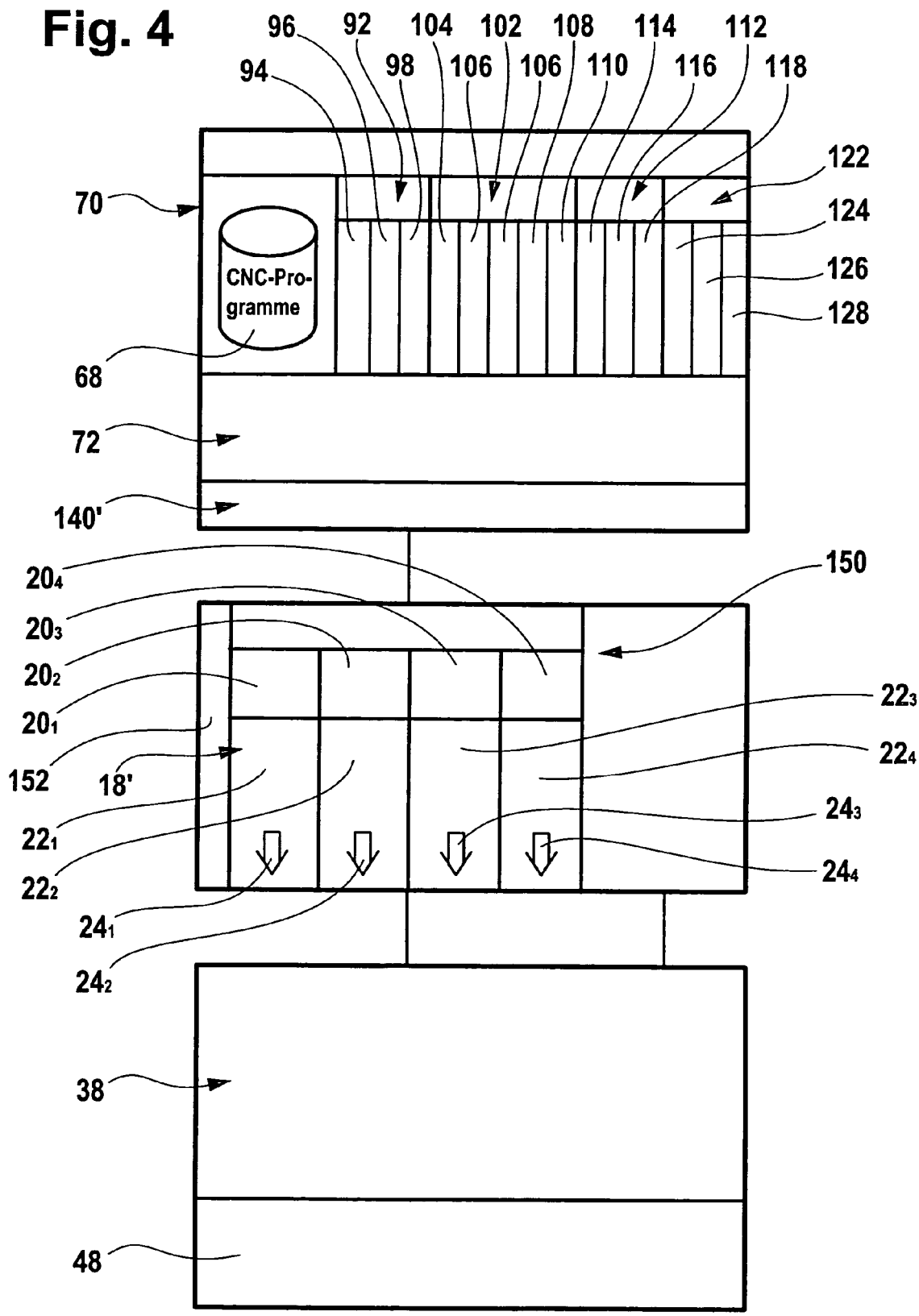
FIG. 4 shows a schematic representation of the program configuration corresponding to FIG. 2 in the case of the second exemplary embodiment of the simulation system according to the invention.

In the case of a second exemplary embodiment of a simulation system according to the invention, represented in FIGS. 3 and 4, those components which are identical to those of the first exemplary embodiment are provided with the same reference numerals, so that for their description reference is made to the full content of the explanations of the first exemplary embodiment.

By contrast with the first exemplary embodiment, in the case of the second exemplary embodiment, as represented in FIG. 4, the control program 18' is not a CNC replication, but comprises the core control program 150 of the actual machine tool, which generates as control commands 24 the same control commands as in the case of the actual machine tool.

In order to be able to operate the core control program 150 as part of the control program 18' of the action control 10, a program environment 152 is provided for the control program 150 and installed on the first data processing unit 12, providing the core control program 150 of the actual machine tool with the same program environment as is the case on the actual machine tool.

Furthermore, in the case of the second exemplary embodiment, associated with the operating control 60 is a second visualization unit 160, which in a way similar to a customary computer or PC is also provided with a separate keypad 82', which corresponds to customary input keys.

On the visualization unit, the machine panel 80' together with its display area 90' and the rows 84' and 86' of function keys 88' is represented as a virtual machine control panel 80', the function keys 88 being able to be actuated by a cursor 162, which for its part can be made to move on the represented image by the keypad 82' or a mouse 164.

This dispenses with the need to provide an actual configuration of the machine control panel 80 in the case of the second exemplary embodiment of the simulation system according to the invention. This has the advantage in particular that the machine control panel 80' can easily be generated by software and can also be adapted to the respectively desired conditions with regard to the position and association of the function keys 88'.

If the control program 18' in the case of the second exemplary embodiment comprises the core control program 150 of the actual machine tool and the operating program 70 corresponds to the actual machine tool, there is no longer any need to provide a separate adaptation program for the communication between the operating program 70 and the control program 18, but instead the adaptation program 140' is the communication program that is used in the case of the actual machine tool for the interaction between the operating program 70 and the core control program 150 of the actual machine tool.

Figure 5:
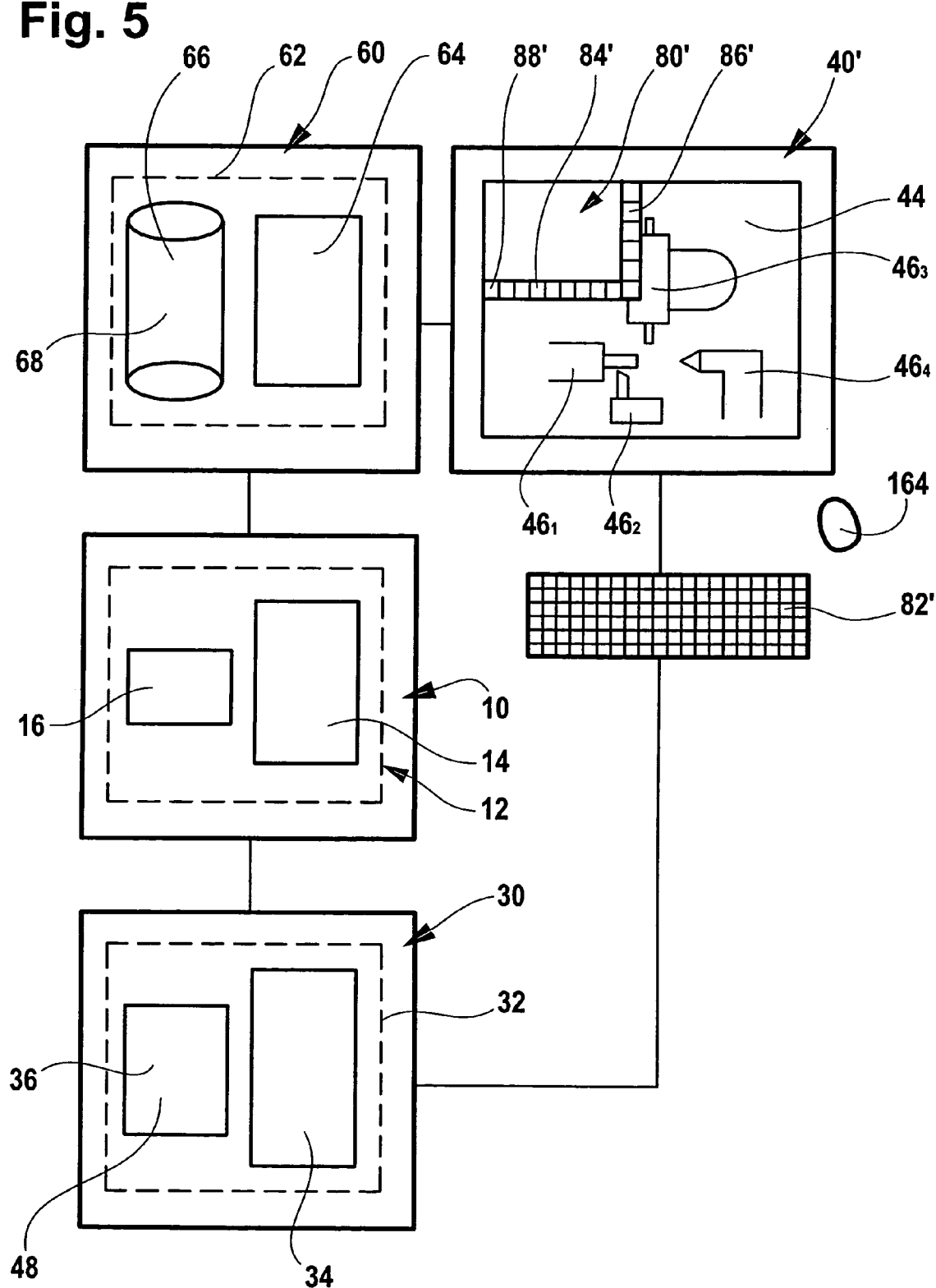
FIG. 5 shows a schematic representation of the equipment configuration corresponding to FIG. 1 in the case of a third exemplary embodiment of a simulation system according to the invention.

In the case of a third exemplary embodiment, represented in FIG. 5, the program structure is identical to that of the second exemplary embodiment.

In a modification with respect to the second exemplary embodiment, the third exemplary embodiment according to FIG. 5 provides that only one visualization unit, namely the visualization unit 40', is used, represented on which are both the virtual machine tool 44 with the machining units 46 and, superposed over the virtual machine tool 44, the virtual machine control panel 80', so that the operator has both the virtual machine tool 44 and the virtual machine control panel 80' available on the same visualization unit 40', in order to run the simulation and influence it by means of the operating program 70 in the manner already described in connection with the first exemplary embodiment.

Both in the case of the first exemplary embodiment and in the case of the second and third exemplary embodiments, the simulation system is a simulation system non-specific to the machine tool and works fully independently of the machine tool.

Figure 6:
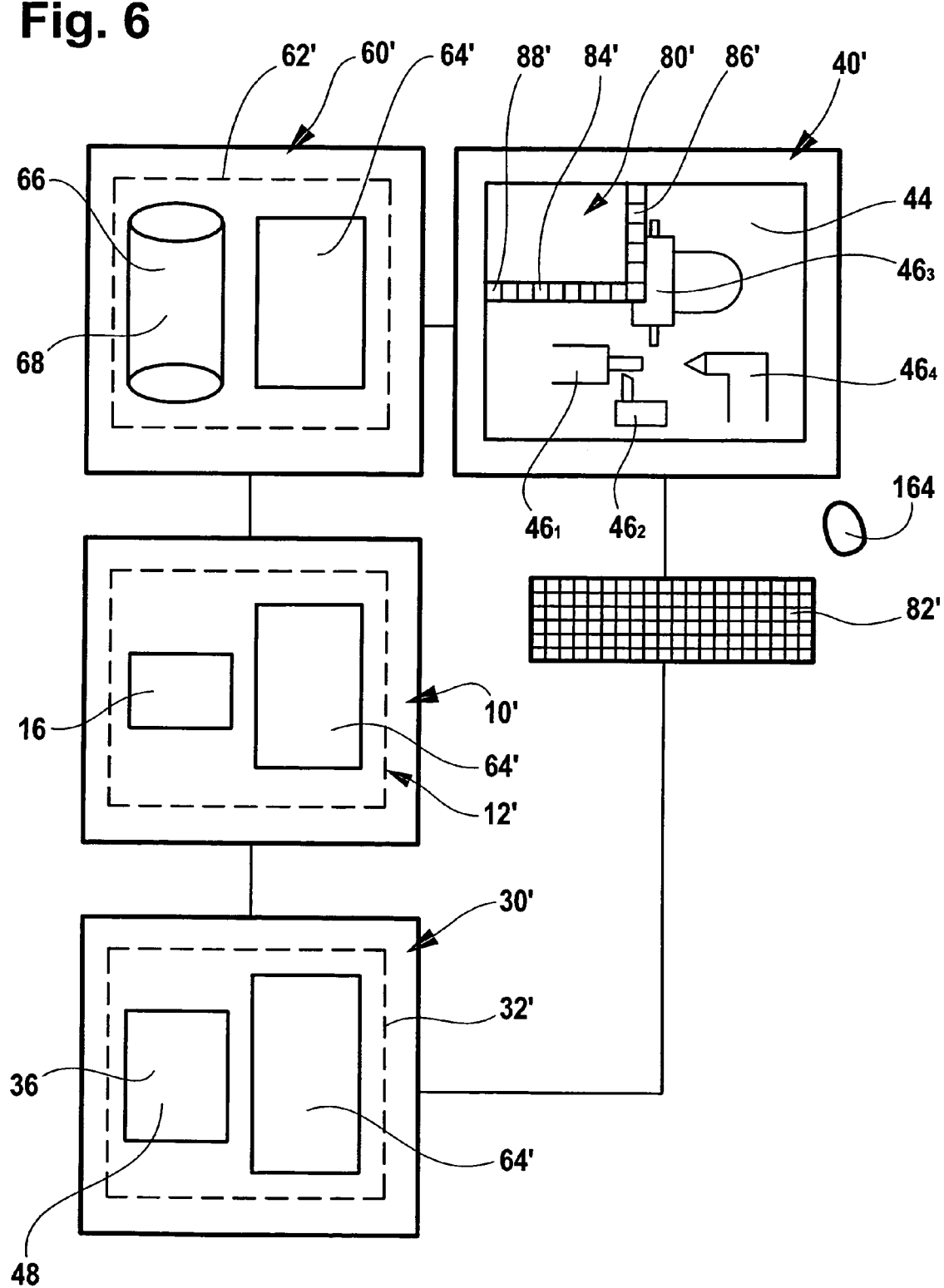
FIG. 6 shows a schematic representation of the equipment configuration corresponding to FIG. 1 in the case of a fourth exemplary embodiment of a simulation system according to the invention and FIG. 7 shows a schematic representation of an exemplary embodiment of a production facility according to the invention.

In the case of a fourth exemplary embodiment, represented in FIG. 6, the simulation system according to the invention is integrated in the operating control 60' of an actual machine tool and the processor 64' is used not only by the operating control 60' but also by the action control 10' and the visualization control 30', although also associated with the processor 64' are the memories 66, 16 and 36, which serve in the manner already described for storing the CNC machining program complex 68, or the partial programs 20 or the machine model 48.

Since the fourth exemplary embodiment of the simulation system according to the invention uses both the operating program 70 of the actual machine tool and the core control program 150 of the actual machine tool, there is the possibility of running a simulation directly on the actual machine tool and using the operating program 70 in the way described to manage the partial programs of the CNC machining program complex 68 or to process or analyze them.

Figure 7:
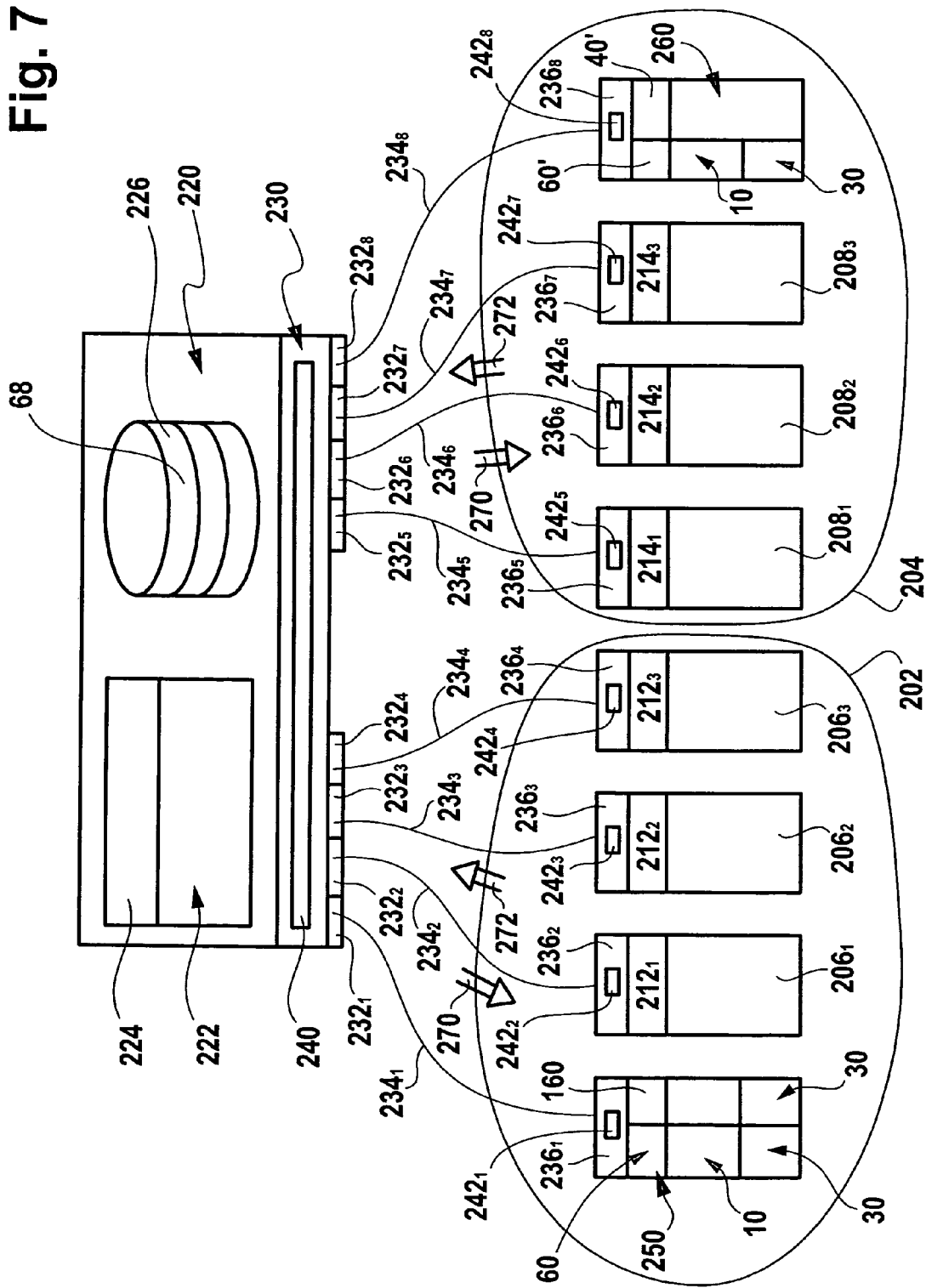

An exemplary embodiment of a production facility, represented in FIG. 7, comprises two production areas 202, 204, machine tools $206_1$, $206_2$ and $206_3$ being used in the production area 202, while machine tools $208_1$, $208_2$ and $208_3$, which are respectively controlled by machine controls $212_1$, $212_2$ and $212_3$ as well as $214_1$, $214_2$ and $214_3$ for the actual machining of workpieces, are used in the production area 204.

The machining of workpieces on these machine tools $206_1$ to $206_3$ as well as $208_1$ to $208_3$ in the production areas 202 and 204, respectively, is in this case organized, that is to say planned and directed, by a production organization system 220, which has a data processing unit 222, which works with a production organization program 224, the production organization program 224 being used for example for planning optimum utilization of the machine tools $206_1$ to $206_3$ in the production area 202 and the machine tools $208_1$ to $208_3$ in the production area 204. For this purpose, workpiece-related CNC machining program complexes 68, which are stored in a data memory 226 of the production organization system 220, are also managed by the production organization program 224, it being possible for the CNC machining program complexes 68 of all the workpieces intended for production to be stored in the data memory 226 until the respective CNC machining program complex 68 intended for the workpiece is required in a machine control $212_1$ to $212_3$ or $214_1$ to $214_3$ of the machine tools $206_1$ to $206_3$ or $208_1$ to $208_3$.

The production organization system 220 also has an organization communication unit 230, which is provided with a series of communication interfaces $232_1$ to $232_8$, the communication interfaces $232_1$ to $232_8$ being connected to communication units $236_1$ to $236_8$ via communication paths $234_1$ to $234_8$, the communication units $236_2$ to $236_7$ being associated with the machine controls $212_1$ to $212_3$ as well as $214_1$ to $214_3$.

To handle the communication between the organization communication unit 230 and the individual communication units $236_1$ to $236_8$, the organization communication unit 230 works with an organization communication program 240, and the communication units $236_1$ to $236_8$ work with communication programs $242_1$ to $242_8$, the organization communication program 240 and the communication programs 242 being coordinated with one another. In the case of an exemplary embodiment, the communication programs 242 in all the communication units $236_1$ to $236_8$ are preferably identical, in order to have the least possible programming effort.

Furthermore, in the case of this exemplary embodiment, the communication units $236_1$ to $236_8$ as well as the communication interfaces $232_1$ to $232_8$ are constructed substantially identically, in order also to minimize the expenditure with regard to the hardware components.

In the case of the production facility according to the invention, no machine controls are associated with the communication units $263_1$ and $236_8$, but instead a simulation system 250 or 260 is respectively associated with them, the simulation system 250 being formed for example in accordance with the second exemplary embodiment described above, represented in FIGS. 3 and 4, while the simulation system 260 is formed in accordance with the fourth exemplary embodiment of the simulation system described above, represented in FIG. 6.

In the case of both simulation systems 250, 260, the operating program 70 is preferably identical to that of the machine controls 212 or 214 of the actual machine tools 206 and 208, respectively, so that no further adaptation between the communication programs $242_1$ and $242_8$ and the operating program 70 is required either, and the communication units $236_1$ and $236_8$ can also be identical to the communication units $236_2$ to $236_7$ that are used for the machine controls $212_1$ to $212_3$ and $214_1$ to $214_3$, even if the operating controls 60 and 60' correspond to those of the actual machine controls $212_1$ to $212_3$ and $214_1$ to $214_3$ of the actual machine tools $206_1$ to $206_3$ and $208_1$ to $208_3$.

Consequently, the production organization system 220 provides a production planning level and production directing level, in order to organise the machining of workpieces on the machine tools $206_1$ to $206_3$ as well as $208_1$ to $208_3$ in the production areas 202 and 204, respectively, with the most optimum possible utilization of the machine tools $206_1$ to $206_3$ and $208_1$ to $208_3$, respectively.

For this purpose, the CNC machining program complexes 68 for the respective workpieces are managed in a workpiece-oriented manner by the production organization program 224 in the data memory 226, so that in the case of a machining operation on a workpiece that is intended on one of the machine tools $206_1$ to $206_3$ and $208_1$ to $208_3$, the respective machine control $212_1$ to $212_3$ or $214_1$ to $214_3$ is transmitted the corresponding CNC machining program complex 68, to be precise via the organization communication unit 230, the organization communication program 240 of which associates the corresponding CNC machining program complex 68 with the corresponding communication interface 232 and transmits the CNC machining program complex 68 via the latter interface and the communication path 234 to the corresponding communication unit 236, which is associated with the respective machine control 212 or $214_1$ so that the respective machine control 212 or 214 has the respective CNC machining program complex 68 available, in order to operate the respective machine tool 206 or 208 for the machining of the workpiece.

In this case, the production organization system 220 is preferably not restricted to transmitting the CNC machining program complex 68 to the respective machine control 212 or 214, but instead there is also the possibility of transmitting additional control instructions 270 via the organization communication unit 230 with the organization communication program 240 to the respective machine control 212 or 214.

In the same way, there is the possibility of receiving acknowledgements 272 from the individual machine controls 212 or 214 via the organization communication unit 230 with the organization communication program 240.

Such control instructions 270 are, for example, control instructions concerning the programmed start of the CNC machining program complex 68 on the respective machine control or concerning the number of workpieces to be processed, or else the programmed stop of the CNC machining program complex 68.

In addition, the control instructions 270 may also contain the instruction to load the CNC machining program complex 68 back again into the production organization system 220 after carrying out the intended machining, in order to store the respective CNC machining program complex 68 in this production organization system in the data memory 226.

The acknowledgements 272 are, for example, acknowledgements concerning machining times or idle times of the respective machine tool 212 or 214 and acknowledgements concerning the number of machined workpieces and the time required for this.

The acknowledgements 272 may, however, also comprise further information on the machining of a workpiece on the respective machine tool 206 or 208; this information may, for example, also be information on the performance of the individual machine tools 206 or 208.

It is important in the case of the production organization system 220 according to the invention that the data structure of all the CNC machining program complexes 68 which can be transmitted to each of the machine controls 212 or 214 is the same and also that the data structure of the control instructions 270 and the acknowledgements 272 is identical, so that the production organization program 224 can process not only the CNC machining program complexes 68 but also the control instructions 270 and the acknowledgements 272 in the same way, irrespective of from which of the machine controls 212 or 214 of the machine tools 206 or 208 they come.

Usually associated with each of the production areas 202 and 204 is a machine operator, who in the case of the CNC machining program complexes capable of running on the machine tools merely has to monitor the function of the machine tools 206, 208, with regard to faults potentially occurring or with regard to interventions in the production sequence that are necessary in the case of some parts.

However, the machine operator in the production areas 202 and 204 usually still has time available during the machining of the workpieces that is in progress on the machine tools 206 or 208 for which he or she is responsible, which is planned and directed substantially by means of the production organization system 220, and this time should be used as effectively as possible.

For this reason, at least one simulation system 250 or 260 is respectively associated with the production areas 202 and 204, providing the machine operator with further possible activities if he or she is not required for the running of the production operation on the machine tools 206 or 208 of the respective production area 202 or 204.

For example, the machine operator of the production area 202 can use the simulation system 250 to create and simulate CNC machining program complexes 68 or simulate such machining program complexes 68 which are made available by the production organization system 220, in order to check their functional capability or in order to gain an impression of which actions of the individual machining units are provided by this CNC machining program complex, in order for example to prepare, and thereby speed up, the running-in process of such a CNC machining program complex 68 on one of the machine tools 206, and consequently save machining times for the machine tools 206.

However, it is also conceivable to use the machine operator for firstly testing and as needs be correcting a created CNC machining program complex 68 by the simulation system 250 with regard to possible collisions or other problematical actions of the machining units, to be precise with the simulation system 250, as already described at length above.

Consequently, all the problems of the CNC machining program complex 68 that can be identified in the simulation's representation of the virtual machining units 46 on the virtual machine tool 44 can be rectified with the simulation system 250, so that, after carrying out the entire simulation and possibly required correction in the simulation system 250, the CNC machining program complex 68 can once again be loaded back into the production organization system 220, in particular into the data memory 226 of the said system.

To make it possible for the production organization system 220, in particular the production organization program 224, to detect whether it is dealing with a CNC machining program complex 68 that has merely been created or a CNC machining program complex 68 that has for example been tested with the simulation system 250 or a CNC machining program complex 68 that has already been successfully used and run without any errors on one of the machine tools 206 and 208, the CNC machining program complexes 68 are provided with a property field which can be read by the production organization program 224.

The production organization program 224 is consequently capable of distinguishing among the individual CNC machining program complexes 68 between CNC machining program complexes 68 that have merely been programmed, CNC machining program complexes 68 that have been simulation-tested or CNC machining program complexes 68 that have already been successfully used in production for the machining of a workpiece, and consequently of making this CNC machining program complex 68 available to one of the machine operators in the production areas 202 and 204 on one of the simulation systems 250 or 260 before such a CNC machining program complex 68 is used for production on one of the machine tools 206 or 208, for the purpose of checking this CNC machining program complex 68 by simulation, and as needs be correcting it.

In the case of the production facility according to the invention that is shown in FIG. 7, a tested and as needs be corrected CNC machining program complex 68 can consequently be taken over once again by the production organization system 220 into the data memory 226 and then likewise made available to a machine operator, wherever possible the machine operator of the production area 202 or 204 who also carried out the simulation, for running-in on one of the available machine tools 206 or 208.

The fact that the machine operator who simulated the CNC machining program complex 68 on the simulation system 250 or 260 is already familiar with the CNC machining program complex 68 means that time is saved when this CNC machining program complex 68 is run in on the actual machine tool 206 or 208. And the time required for the running-in of this CNC machining program complex 68 is reduced considerably, especially since the worst errors, in particular the worst programming errors, which could lead to collisions of the machining units 46, have already been eliminated.

Furthermore, time is saved to a considerable extent by a CNC machining program complex 68 allowing itself to be created and/or simulated just by the capabilities of the production facility, namely the simulation systems 250 or 260, by a machine operator during time not required for the actually machining machine tools 206 or 208, and then allowing itself immediately to be used for controlling one of the actual machine tools 206 or 208, to be precise managed by the production organization program 224, without further steps being required.

In this case, a major advantage of the production facility according to the invention can be achieved if the communication between the production organization system 220 and the respective simulation system 250 or 260 takes place in precisely the same way as with the machine controls 212 or 214, so that no modifications are required on the part of the production organization program 224 and the organization communication program 240 or on the part of the communication programs $242_1$ and $242_8$ which are used for the simulation systems 250 and 260, and consequently the hardware and software that is used in any case for the communication with the machine controls 212 and 214 can be used, so that the entire communication between the production organization system 220 and the simulation system 250 or 260 is identical to the communication with the machine controls 212 or 214, and consequently any need for adaptation is no longer required.

The invention claimed is:

1. Simulation system for representing actions of machining units of a machine tool, in particular actions in the machining of a workpiece, in accordance with a CNC machining program complex by means of at least one first visualization unit in the form of actions of virtual machining units of a virtual machine tool,
   comprising an action control, which has at least one first data processing unit, which establishes control commands for actions of the virtual machining units by a control program processing CNC blocks of the CNC machining program complex,
   and a visualization control, which has at least one second data processing unit, which represents actions of the virtual machining units on the first visualization unit by a visualization program on the basis of configuration data of a stored machine model and the control commands determined by the action control,
   the simulation system comprising an operating control with a third data processing unit, which operates the action control by an operating program, and the operating program having a program management function, which transfers at least program parts of the CNC machining program complex in a workpiece-related manner from said CNC machining program complex stored in a memory of the third data processing unit to the action control for executing said program complex.

2. Simulation system according to claim 1, wherein a machine control panel is associated with the operating control.

3. Simulation system according to claim 2, wherein, by means of the machine control panel, the work of the operating program can be controlled by means of callable functions.

4. Simulation system according to claim 3, wherein the machine control panel has manual input elements for activating individual functions of the operating program.

5. Simulation system according to claim 2, wherein the machine control panel has manual input elements for influencing the CNC machining program complex.

6. Simulation system according to claim 2, wherein the machine control panel has manual input elements for operating functions of the action control.

7. Simulation system according to claim 6, wherein the machine control panel comprises manual input elements for starting/stopping at least one partial program in the action control.

8. Simulation system according to claim 2, wherein the operating control is coupled with a display area of the machine control panel, and in that the operating control presents on the display area information from the operating program that is intended to be indicated to an operator.

9. Simulation system according to claim 2, wherein the machine control panel is a virtual machine control panel represented on a visualization unit.

10. Simulation system according to claim 9, wherein the manual input elements of the virtual machine control panel can be manually actuated by a cursor of the visualization unit.

11. Simulation system according to claim 1, wherein the program management function of the operating program manages partial programs of the CNC machining program complex in a workpiece-related manner.

12. Simulation system according to claim 1, wherein the program management function of the operating program stores partial programs of the CNC machining program complex in a workpiece-related manner.

13. Simulation system according to claim 1, wherein the program management function of the operating program saves partial programs of the CNC machining program complex in a workpiece-related manner.

14. Simulation system according to claim 1, wherein the program management function of the operating program transmits partial programs of the CNC machining program complex to the action control in a workpiece-related manner.

15. Simulation system according to claim 1, wherein the program management function of the operating program distributes and activates in a workpiece-related manner partial programs of the CNC machining program complex on individual channels of the action control.

16. Simulation system for representing actions of machining units of a machine tool, in particular actions in the machining of a workpiece, in accordance with a CNC machining program complex by means of at least one first visualization unit in the form of actions of virtual machining units of a virtual machine tool,
   comprising an action control, which has at least one first data processing unit, which establishes control commands for actions of the virtual machining units by a control program processing CNC blocks of the CNC machining program complex,
   and a visualization control, which has at least one second data processing unit, which represents actions of the virtual machining units on the first visualization unit by a visualization program on the basis of configuration data of a stored machine model and the control commands determined by the action control,
   the simulation system comprising an operating control with a third data processing unit, which operates the action control by an operating program, the operating program comprising a program processing function by which the CNC machining program complex can be modified by access at least to program parts of the CNC machining program complex.

17. Simulation system according to claim 16, wherein the program processing function comprises a program creation mode.

18. Simulation system according to claim 16, wherein the program processing function comprises an input mode for correction values.

19. Simulation system according to claim 16, wherein the program processing function automatically takes over a program modification into the CNC machining program complex.

20. Simulation system according to claim 16, wherein the program processing function automatically loads the partial programs that are present in the action control back into the operating control for modification.

21. Simulation system according to claim 16, wherein the program processing function comprises an input mode for tools.

22. Simulation system according to claim 16, wherein the program processing function comprises an input mode for tool corrections.

23. Simulation system for representing actions of machining units of a machine tool, in particular actions in the machining of a workpiece, in accordance with a CNC machining program complex by means of at least one first visualization unit in the form of actions of virtual machining units of a virtual machine tool,
   comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, the operating program comprising an analysis function, wherein, in an identification mode of the analysis function, an NC block currently being processed in the action control is identifiable.

24. Simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, the operating program comprising an analysis function, wherein, in a display mode of the analysis function, the at least one program command that is active at the time can be displayed.

25. Simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, the operating program comprising an analysis function, wherein, in a parameter display mode of the analysis function, at least one parameter of at least one of the virtual machining units can be displayed.

26. Simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, the operating program corresponding to the operating program of the actual machine tool.

27. Simulation system according to claim 26, wherein, for communication with the control program, the operating program interacts with an adaptation program.

28. Simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, wherein an adaptation program is used to adapt the operation program to the control program of the action control such that the control program is non-specific to the machine tool.

29. Simulation system for representing actions of machining units of a machine tool, in particular actions in the machining of a workpiece, in accordance with a CNC machining program complex by means of at least one first visualization unit in the form of actions of virtual machining units of a virtual machine tool, comprising an action control, which has at least one first data processing unit, which establishes control commands for actions of the virtual machining units by a control program processing CNC blocks of the CNC machining program complex, and a visualization control, which has at least one second data processing unit, which represents actions of the virtual machining units on the first visualization unit by a visualization program on the basis of configuration data of a stored machine model and the control commands determined by the action control, the simulation system comprising an operating control with a third data processing unit, which operates the action control by an operating program, the control program of the action control comprising the core control program of the actual machine tool for producing the control commands.

30. Simulation system according to claim 29, wherein the first data processing unit has a program environment, in which the core control program of the actual machine tool works and produces control commands which correspond to control commands of the actual machine tool.

31. Simulation system according to claim 29, wherein the adaptation program corresponds to the communication program of the actual operating control of the machine tool.

32. Simulation system according to claim 1, wherein the first data processing unit and the second data processing unit work with the same processor.

33. Simulation system according to claim 1, wherein the first, second and third data processing units work with the same processor.

34. Simulation system according to claim 1, wherein the first data processing unit and/or the second data processing unit and/or the third data processing unit are data processing units that are non-specific to the machine tool.

35. Simulation system according to claim 1, wherein the third data processing unit uses the processor associated with the operating control of the actual machine tool.

36. Simulation system according to claim 1, wherein the second data processing unit uses the processor associated with the operating control of the actual machine tool.

37. Simulation system according to claim 1, wherein the first data processing unit uses the processor associated with the operating control of the actual machine tool.

38. Simulation system according to claim 1, wherein the visualization unit for representing the virtual machining units and the visualization unit for representing the virtual machine control panel are separate units.

39. Simulation system according to claim 1, wherein the visualization unit for representing the virtual machining units and the visualization unit for representing the virtual machine control panel are identical.

40. Simulation system according to claim 39, wherein the representation of the actions of the virtual machining units and the representation of the virtual machine control panel takes place at least partially superposed.

41. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
in which method an action control establishes control commands for actions of the virtual machining units by a control program processing CNC blocks of the CNC machining program complex,
and in which method a visualization control represents actions of the virtual machining units on the first visualization unit by a visualization program on the basis of configuration data of a stored machine model and the control commands determined by the action control,
an operating control using an operating program to operate the action control and the operating program using a program management function to transfer at least program parts of the CNC machining program complex in a workpiece-related manner from said stored CNC machining program complex to the action control for executing said program complex.

42. Method according to claim 41, wherein the work of the operating program is controlled by means of a machine control panel, by means of callable functions.

43. Method according to claim 41, wherein individual functions of the operating program are activated by means of manual input elements of the machine control panel.

44. Method according to claim 41, wherein influencing the CNC machining program complex takes place by means of manual input elements.

45. Method according to claim 41, wherein functions of the action control are operated by means of manual input elements.

46. Method according to claim 45, wherein starting/stopping at least a partial program in the action control takes place by means of manual input elements.

47. Method according to claim 41, wherein the operating control presents on a display area of the machine control panel information from the operating program that is intended to be indicated to an operator.

48. Method according to claim 41, wherein the machine control panel is represented as a virtual machine control panel on a visualization unit.

49. Method according to claim 48, wherein the manual input elements of the virtual machine control panel are manually actuated by a cursor of the visualization unit.

50. Method according to claim 41, wherein partial programs of the CNC machining program complex are managed in a workpiece-related manner by the program management function of the operating program.

51. Method according to claim 41, wherein partial programs of the CNC machining program complex are stored in a workpiece-related manner by the program management function of the operating program.

52. Method according to claim 41, wherein partial programs of the CNC machining program complex are saved in a workpiece-related manner by the program management function of the operating program.

53. Method according to claim 41, wherein partial programs of the CNC machining program complex are transmitted to the action control in a workpiece-related manner by the program management function of the operating program.

54. Method according to claim 41, wherein partial programs of the CNC machining program complex are distributed and activated in a workpiece-related manner on individual channels of the action control by the program management function of the operating program.

55. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
in which method an action control establishes control commands for actions of the virtual machining units by a control program processing CNC blocks of the CNC machining program complex,
and in which method a visualization control represents actions of the virtual machining units on the first visualization unit by a visualization program on the basis of configuration data of a stored machine model and the control commands determined by the action control,
an operating control using an operating program to operate the action control, the operating program comprising a program processing function by which the CNC machining program complex can be modified by access at least to program parts of the CNC machining program complex.

56. Method according to claim 55, wherein, with a program creation mode of the program processing function, at least program parts are created.

57. Method according to claim 55, wherein, with an input mode of the program processing function, correction values are input.

58. Method according to claim 55, wherein a program modification is automatically taken over into the CNC machining program complex by the program processing function.

59. Method according to claim 55, wherein the partial programs that are present in the action control are automatically loaded by the program processing function back into the operating control for modification.

60. Method according to claim 55, wherein, with an input mode of the program processing function, inputs are made.

61. Method according to claim 55, wherein, with an input mode of the program processing function, tool corrections are performed.

62. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
  in which method an action control establishes control commands for actions of the virtual machining units by a control program processing CNC blocks of the CNC machining program complex,
  and in which method a visualization control represents actions of the virtual machining units on the first visualization unit by a visualization program on the basis of configuration data of a stored machine model and the control commands determined by the action control,
  an operating control using an operating program to operate the action control, a program analysis being carried out with an analysis function of the operating program.

63. Method according to claim 62, wherein, with an identification mode of the analysis function, an NC block that is currently being processed in the action control is identified.

64. Method according to claim 62, wherein, with a display mode of the analysis function, the at least one program command that is active at the time is displayed.

65. Method according to claim 62, wherein, with a parameter display mode of the analysis function, at least one parameter of at least one of the virtual machining units is displayed.

66. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
  in which method an action control establishes control commands for actions of the virtual machining units by a control program processing CNC blocks of the CNC machining program complex,
  and in which method a visualization control represents actions of the virtual machining units on the first visualization unit by a visualization program on the basis of configuration data of a stored machine model and the control commands determined by the action control,
  an operating control using an operating program to operate the action control, the operating program corresponding to the operating program of the actual machine tool.

67. Method according to claim 66, wherein the operating program communicates with the control program via an adaptation program.

68. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
  in which method an action control establishes control commands for actions of the virtual machining units by a control program processing CNC blocks of the CNC machining program complex,
  and in which method a visualization control represents actions of the virtual machining units on the first visualization unit by a visualization program on the basis of configuration data of a stored machine model and the control commands determined by the action control,
  an operating control using an operating program to operate the action control, the control program of the action control being a control program non-specific to the machine tool.

69. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
  in which method an action control establishes control commands for actions of the virtual machining units by a control program processing CNC blocks of the CNC machining program complex,
  and in which method a visualization control represents actions of the virtual machining units on the first visualization unit by a visualization program on the basis of configuration data of a stored machine model and the control commands determined by the action control,
  an operating control using an operating program to operate the action control, the control program of the action control works with the core control program of the actual machine tool for producing the control commands.

70. Method according to claim 69, wherein the control program comprises a program environment, in which the core control program of the actual machine tool works and produces control commands which correspond to control commands of the actual machine tool.

71. Method for operating a simulation system for representing actions of machining units of a machine tool, in particular actions in the machining of a workpiece, in accordance with a CNC machining program complex by means of at least one first visualization unit in the form of actions of virtual machining units of a virtual machine tool,
  in which method an action control establishes control commands for actions of the virtual machining units by a control program processing CNC blocks of the CNC machining program complex,
  and in which method a visualization control represents actions of the virtual machining units on the first visualization unit by a visualization program on the basis of configuration data of a stored machine model and the control commands determined by the action control,
  an operating control using an operating program to operate the action control, the operating program running on the processor associated with the operating control of the actual machine tool.

72. Method according to claim 41, wherein the visualization program runs on the processor associated with the operating control of the actual machine tool.

73. Method according to claim 41, wherein the control program runs on the processor associated with the operating control of the actual machine tool.

74. Method according to claim 41, wherein actions of the virtual machining units and the virtual machine control panel are represented at least partially superposed.

75. Production facility for workpieces comprising
   at least one production area in which at least one machine tool provided with a machine control is disposed,
   a production organization system with a data processing unit, which is coupled with the at least one machine control via a communication path, and with a production organization program, which provides CNC machining program complexes for the machining of workpieces of the at least one machine tool,
   at least one simulation system for representing actions of machining units of a machine tool, in particular actions in the machining of a workpiece, in accordance with a CNC machining program complex by means of at least one first visualization unit in the form of actions of virtual machining units of a virtual machine tool being associated with the production facility, the simulation system being coupled with the production organization system and the simulation system comprising an action control, which has at least one first data processing unit, which establishes control commands for actions of the virtual machining units by a control program processing CNC blocks of the CNC machining program complex,
   and a visualization control, which has at least one second data processing unit, which represents actions of the virtual machining units on the first visualization unit by a visualization program on the basis of configuration data of a stored machine model and the control commands determined by the action control,
   the simulation system comprising an operating control with a third data processing unit, which operates the action control by an operating program, and the operating program having a program management function, which transfers at least program parts of the CNC machining program complex in a workpiece-related manner from said CNC machining program complex stored in a memory of the third data processing unit to the action control for executing said program complex.

76. Production facility according to claim 75, wherein the production facility has a number of production areas, which are coupled with the production organization system.

77. Production facility according to claim 75, wherein a number of simulation systems are associated with the production organization system.

78. Production facility according to claim 75, wherein the simulation system is associated with one production area.

79. Production facility according to claim 75, wherein at least one simulation system for representing actions of machining units is respectively associated with a number of production areas.

80. Production facility according to claim 75, wherein the communication path between the production organization system and the at least one machine control and the communication path between the production organization system and the respective simulation system are identically formed.

81. Production facility according to claim 75, wherein the production organization system provides the simulation system with CNC machining program complexes for the simulation of actions of virtual machining units on a virtual machine tool.

82. Production facility according to claim 75, wherein the production organization system has an organization communication unit with at least one communication interface and in that the machine control is coupled with the at least one communication interface.

83. Production facility according to claim 82, wherein the organization communication unit has a further communication interface, with which the at least one simulation system is coupled.

84. Production facility according to claim 83, wherein the communication interface for the at least one simulation system and the at least one communication interface for the at least one machine control are formed substantially identically.

85. Production facility according to claim 75, wherein the organization communication unit has an organization communication program for the communication with the at least one machine control.

86. Production facility according to claim 75, wherein the organization communication unit has an organization communication program for the communication with the simulation system.

87. Production facility according to claim 85, wherein the organization communication program for the communication with the at least one machine control is substantially identical to the organization communication program for the communication with the at least one simulation system.

88. Production facility according to claim 75, wherein a communication unit with a communication program for the communication with the production organization system is associated with the respective machine control.

89. Production facility according to claim 75, wherein a communication unit with a communication program for the communication with the production organization system is associated with the simulation system.

90. Production facility according to claim 88, wherein the communication program of the respective simulation system works with identical data formats and data specifications as the communication program of the respective machine control.

91. Production facility according to claim 90, wherein the communication program of the simulation system is substantially identical to the communication program of the respective machine control.

92. Production facility according to claim 75, wherein CNC machining program complexes processed by the machine controls can be transferred to the production organization system.

93. Production facility according to claim 75, wherein CNC machining program complexes simulated by the respective simulation system can be transferred to the production organization system.

94. Production facility according to claim 92, wherein the production organization system manages CNC machining program complexes transferred from the respective simulation system in the same way as CNC machining program complexes transferred from the at least one machine control.

95. Production facility according to claim 75, wherein the production organization system receives from the at least one machine control acknowledgements regarding the processing of the respective CNC machining program complex in said machine control.

96. Production facility according to claim 75, wherein the production organization system receives from the respective simulation system acknowledgements regarding the processing of the respective CNC machining program complex.

97. Production facility according to claim 95, wherein the acknowledgements from the at least one machine control and the acknowledgements from the respective simulation system have a substantially identical structure.

98. Production facility according to claim 75, wherein the production organization system transmits control instructions to the at least one machine control.

99. Production facility according to claim 75, wherein the production organization system transmits control instructions to the respective simulation system.

100. Production facility according to claim 98, wherein the control instructions for the at least one machine control and the control instructions for the respective simulation system have a substantially identical structure.

101. Production facility according to claim 75, wherein the production organization system has a data memory for the CNC machining program complexes.

102. Production facility according to claim 75, wherein the CNC machining program complexes are identifiable by a property field as untested or simulation-tested for the production organization program.

103. Production facility according to claim 102, wherein the CNC machining program complexes are identifiable by the property field as production-tested for the production organization program.

104. Production facility according to claim 75, wherein the production organization system manages the CNC machining program complexes in a workpiece-related manner.

105. Method for operating a production facility for workpieces, comprising
at least one production area, in which at least one machine tool provided with a machine control is disposed, and
a production organization system, a production organization program communicating with the at least one machine control via a communication path, and CNC machining program complexes for the machining of workpieces of the at least one machine tool being provided by the production organization program, at least one method for operating a simulation system for representing actions of machining units of a machine tool, in particular actions in the machining of a workpiece, in accordance with a CNC machining program complex by means of at least one first visualization unit in the form of actions of virtual machining units of a virtual machine tool, being available for operating the production facility, the method interacting with the production organization program and in which method an action control establishes control commands for actions of the virtual machining units by a control program processing CNC blocks of the CNC machining program complex,
and in which method a visualization control represents actions of the virtual machining units on the first visualization unit by a visualization program on the basis of configuration data of a stored machine model and the control commands determined by the action control,
an operating control using an operating program to operate the action control and the operating program using a program management function to transfer at least program parts of the CNC machining program complex in a workpiece-related manner from said stored CNC machining program complex to the action control for executing said program complex.

106. Method according to claim 105, wherein a number of production areas are coupled with the production organization program.

107. Method according to claim 105, wherein the production organization program works together with a number of simulation systems.

108. Method according to claim 105, wherein the simulation system is associated with one production area.

109. Method according to claim 105, wherein at least one of the simulation systems is respectively associated with a number of production areas.

110. Method according to claim 105, wherein the communication between the production organization program and the at least one machine control and between the production organization system and the respective simulation system is carried out substantially identically.

111. Method according to claim 105, wherein CNC machining program complexes for the simulation of actions of virtual machining units on a virtual machine tool are made available to the simulation system by the production organization program.

112. Method according to claim 105, wherein an organization communication program is used for the communication with the at least one machine control.

113. Method according to claim 105, wherein an organization communication program is used for the communication with the simulation system.

114. Method according to claim 112, wherein the organization communication program for the communication with the at least one machine control is substantially identical to the organization communication program for the communication with the at least one simulation system.

115. Method according to claim 105, wherein a communication program is used by the respective machine control for the communication with the production organization program.

116. Method according to claim 105, wherein a communication program is used by the simulation system for the communication with the production organization system.

117. Method according to claim 115, wherein the communication program of the respective simulation system works with identical data formats and data specifications as the communication program of the respective machine control.

118. Method according to claim 117, wherein the communication program of the simulation system is substantially identical to the communication program of the respective machine control.

119. Method according to claim 105, wherein CNC machining program complexes processed by the machine controls are transferred to the production organization program.

120. Method according to claim 105, wherein CNC machining program complexes simulated by the respective simulation system are transferred to the production organization program.

121. Method according to claim 119, wherein CNC machining program complexes transferred from the respective simulation system are managed by the production organization program in the same way as CNC machining program complexes transferred from the at least one machine control.

122. Method according to claim 105, wherein acknowledgements regarding the processing of the respective CNC machining program complex are transferred to the production organization program from the at least one machine control.

123. Method according to claim 105, wherein acknowledgements regarding the processing of the respective CNC machining program complex are transferred to the production organization program from the respective simulation system.

124. Method according to claim 122, wherein the acknowledgements from the at least one machine control and the acknowledgements from the respective simulation system have a substantially identical structure.

125. Method according to claim 105, wherein control instructions are transmitted from the production organization program to the at least one machine control.

126. Method according to claim 105, wherein control instructions are transmitted from the production organization program to the respective simulation system.

127. Method according to claim 125, wherein the control instructions for the at least one machine control and the control instructions for the respective simulation system have a substantially identical structure.

128. Method according to claim 105, wherein the CNC machining program complexes are identified as untested or simulation-tested for the production organization program by a property field.

129. Method according to claim 128, wherein the CNC machining program complexes are identified as production-tested for the production organization program by the property field.

130. Method according to claim 105, wherein the CNC machining program complexes are managed by the production organization program in a workpiece-related manner.

* * * * *